United States Patent
Slot et al.

(10) Patent No.: US 10,065,381 B2
(45) Date of Patent: Sep. 4, 2018

(54) POSITIONING DEVICE FOR USE IN A TIRE BUILDING SYSTEM AND A METHOD FOR POSITIONING A BEAD

(71) Applicant: VMI HOLLAND B.V., Epe (NL)

(72) Inventors: Marco Slot, Westerbrook (NL); Gerardus Johannes Catharina Van Laar, Scherpenzeel (NL)

(73) Assignee: VMI HOLLAND B.V., Epe (NL)

( * ) Notice: Subject to any disclaimer, the term of this patent is extended or adjusted under 35 U.S.C. 154(b) by 321 days.

(21) Appl. No.: 14/363,081

(22) PCT Filed: Mar. 15, 2013

(86) PCT No.: PCT/NL2013/050185
§ 371 (c)(1),
(2) Date: Jun. 5, 2014

(87) PCT Pub. No.: WO2013/172702
PCT Pub. Date: Nov. 21, 2013

(65) Prior Publication Data
US 2014/0363260 A1    Dec. 11, 2014

(30) Foreign Application Priority Data
May 15, 2012   (NL) ..................................... 2008819

(51) Int. Cl.
| | |
|---|---|
| *B29D 30/00* | (2006.01) |
| *B25J 15/00* | (2006.01) |
| *B25J 11/00* | (2006.01) |

(52) U.S. Cl.
CPC ........... *B29D 30/0016* (2013.01); *B25J 11/00* (2013.01); *B25J 15/0047* (2013.01); *B29D 2030/0044* (2013.01)

(58) Field of Classification Search
CPC ........ B29D 30/18; B29D 30/32; B29D 30/48; B29D 2030/0044; B29D 2030/3207;
(Continued)

(56) References Cited

U.S. PATENT DOCUMENTS

| | | | |
|---|---|---|---|
| 3,944,456 A | * | 3/1976 | Cantarutti .............. B29D 30/32 156/132 |
| 3,960,260 A | | 6/1976 | Azuma et al. |

(Continued)

FOREIGN PATENT DOCUMENTS

| | | |
|---|---|---|
| CN | 1410253 A | 4/2003 |
| EP | 1 683 628 A1 | 7/2006 |

(Continued)

OTHER PUBLICATIONS

TIPO Search Report issued in Taiwan Patent Application No. 102109876 dated Dec. 22, 2015.
(Continued)

*Primary Examiner* — Geoffrey L Knable
(74) *Attorney, Agent, or Firm* — RatnerPrestia

(57) ABSTRACT

The invention relates to a positioning device for use in a tire building system and a method for positioning a bead. The device includes a holding unit including a substantially planar holding surface having a first side, a transport unit movable parallel to the holding surface and including a gripper for gripping the bead and moving the gripped bead substantially along the holding surface, and a bead retainer arranged for at least temporarily retaining the bead in abutment against the holding surface at the first side thereof. The gripper is moveable between a first position in which the gripper projects at least partially out of the holding surface at the first side thereof for gripping the bead, and a second position, in which the gripper is completely arranged behind the holding surface, as viewed from the first side.

23 Claims, 5 Drawing Sheets

(58) Field of Classification Search
CPC .. B25J 15/0028; B25J 15/0047; B25J 15/009; B25J 15/0095; B65G 47/38; B65G 17/16; B65G 17/005
See application file for complete search history.

(56) References Cited

U.S. PATENT DOCUMENTS

| | | | |
|---|---|---|---|
| 3,982,989 A * | 9/1976 | Badenkov | B29D 30/18 156/131 |
| 4,239,565 A | 12/1980 | Henley et al. | |
| 4,264,387 A * | 4/1981 | Allitt | B29D 30/32 156/131 |
| 4,293,358 A | 10/1981 | Loeffler et al. | |
| 4,553,894 A | 11/1985 | Mukae et al. | |
| 4,964,931 A | 10/1990 | Ring | |
| 5,328,533 A | 7/1994 | Yasuno et al. | |
| 5,540,803 A * | 7/1996 | Miyamoto | B29D 30/005 156/111 |
| 2004/0186619 A1 * | 9/2004 | Pellerin | G01B 11/04 700/230 |
| 2012/0024480 A1 | 2/2012 | Matsuyama et al. | |

FOREIGN PATENT DOCUMENTS

| | | |
|---|---|---|
| EP | 2 127 858 A1 | 12/2009 |
| KR | 2003-0014448 A * | 2/2003 |
| TW | 323986 | 1/1998 |
| TW | 469875 | 12/2001 |
| TW | M369001 | 11/2009 |
| TW | M376375 | 3/2010 |

OTHER PUBLICATIONS

International Search Report for PCT/NL2013/050185 dated Jun. 18, 2013.

* cited by examiner

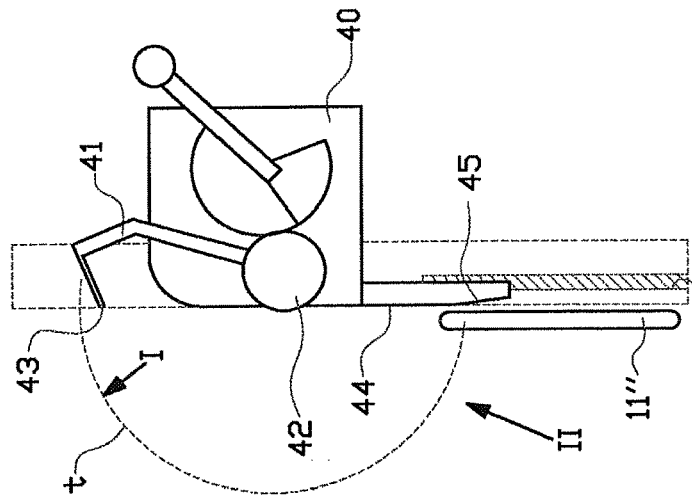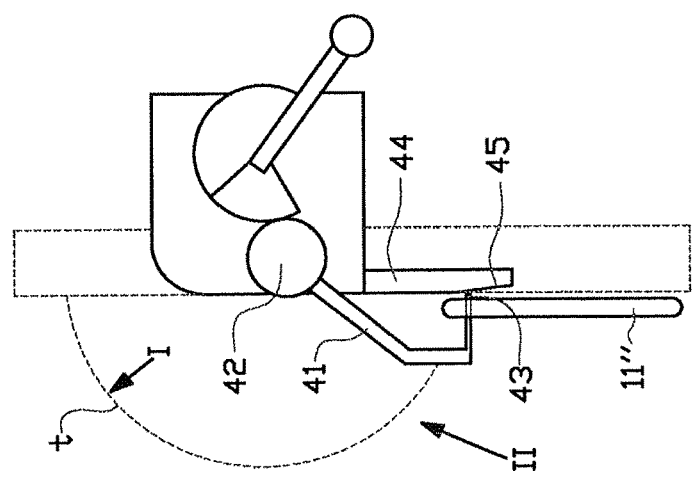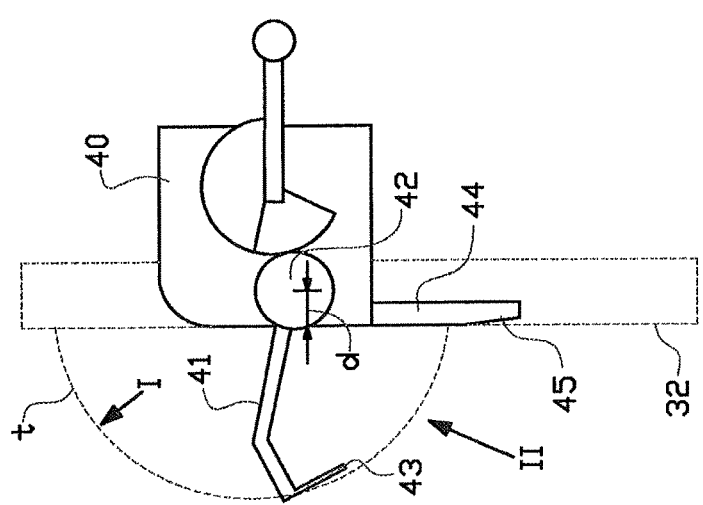

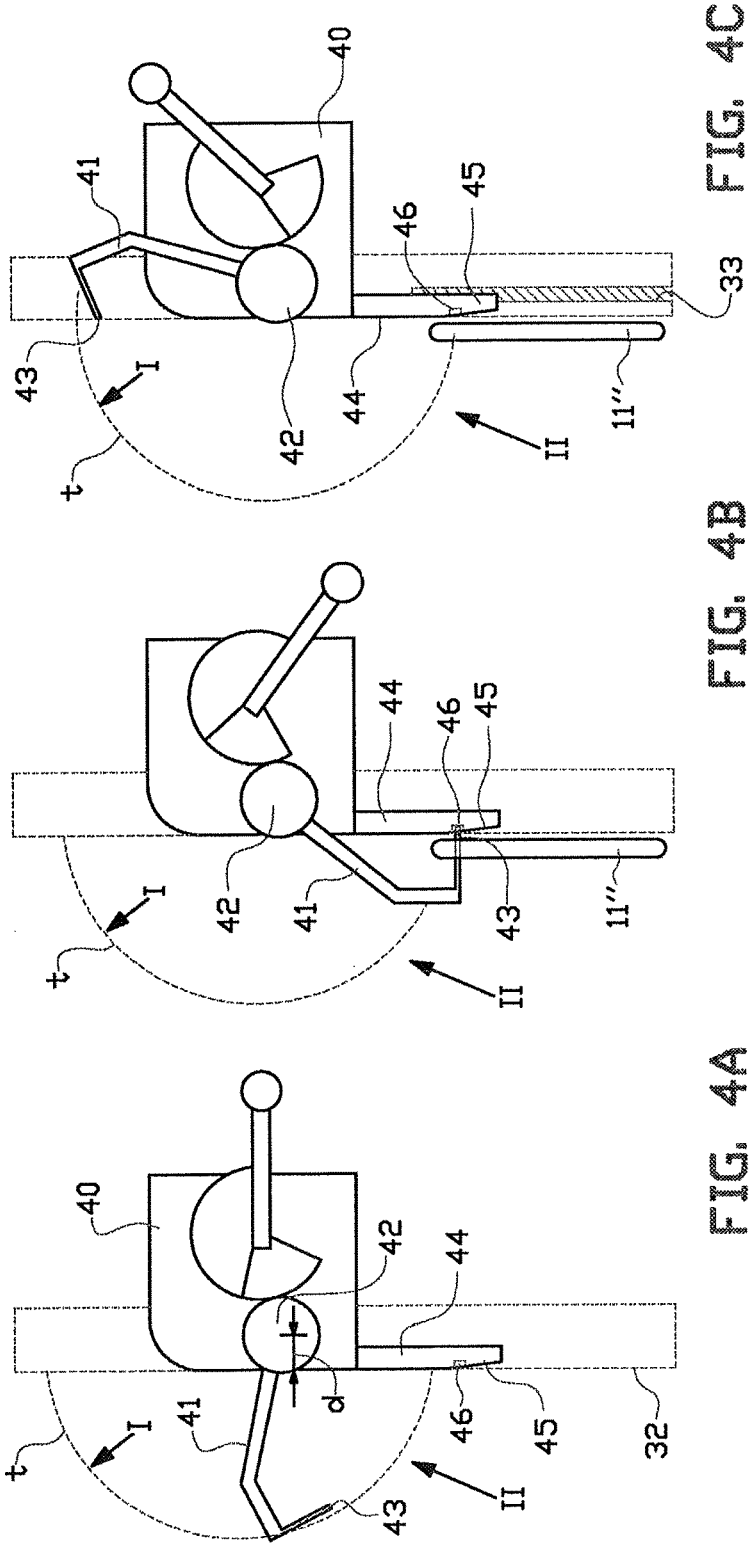

POSITIONING DEVICE FOR USE IN A TIRE BUILDING SYSTEM AND A METHOD FOR POSITIONING A BEAD

CROSS REFERENCE TO RELATED APPLICATIONS

This application is the U.S. National Phase Application of PCT/NL2013/050185, filed Mar. 15, 2013, which claims priority to Netherlands Patent Application No. 2008819, filed May 15, 2012, the contents of such applications being incorporated by reference herein.

BACKGROUND

The invention relates to a positioning device for use in a tire building system and a method for positioning a bead.

In the process of tire manufacturing, individual beads are to be supplied to an apparatus for forming a tire bead assembly. Such a tire bead assembly comprises a bead with a surrounding bead filler. Such an apparatus for forming a tire bead assembly is for example disclosed in US Patent Application 2012/0024480 A1.

Usually a plurality of beads is arranged on a bead supply unit. For supplying individual beads to the apparatus for forming the tire bead assembly, a single bead is removed from the bead supply unit and is delivered one by one to the apparatus for forming the tire bead assembly by a suitable conveyance means.

The US Patent Application 2012/0024480 discloses a suitable conveyance means comprising a transport unit which is movable along a rail, which transport unit comprises two support members. The two support members are arranged to be horizontally at a distance to each other. When a bead is arranged on said support member, the inner circumference of the bead rests at two positions on the support members, as schematically shown in FIG. 1 of the US Patent Application 2012/0024480.

The beads are engaged and conveyed one by one from the supply unit by the conveyance means and supplied by the conveyance means to a rotary support body of the apparatus for forming a tire bead assembly.

A disadvantage of the known transport unit is that the conveyance means can only move back to the supply unit for engaging the subsequent bead, after the previous bead is supplied to the rotary support body. The known transport unit has a relatively long cycle time, which in case of a high speed apparatus for forming a tire bead assembly may dominate the cycle time of the manufacturing of the tire bead assembly.

It is an object of the present invention to provide a transport unit with a reduced cycle time.

SUMMARY OF THE INVENTION

According to a first aspect, the invention provides a positioning device for use in a tire building system and for positioning a bead, the device comprising:
- a holding unit comprising a substantially planar holding surface having a first side,
- a transport unit movable parallel to the holding surface and comprising a gripper for gripping the bead and moving the gripped bead substantially along the holding surface, and
- a bead retainer arranged for at least temporarily retaining the bead in abutment against the holding surface at the first side thereof, wherein the gripper is moveable between a first position in which the gripper projects at least partially out of the holding surface at the first side thereof for gripping the bead, and a second position, in which the gripper is completely arranged behind the holding surface, as viewed from the first side.

The positioning device of the invention is arranged for gripping or engaging one bead from the supply unit by means of the gripper, and for conveying the bead along the holding surface of the holding unit to a position on the holding surface where the bead is retained in abutment against the holding surface at the first side thereof. When the bead is retained, the gripper moves back to the second position behind the holding surface and a transfer unit, for example comprising a robotic arm, picks up the bead from the holding unit and arranges the bead on a support body of an apparatus for forming a tire bead assembly. During the action of the transfer unit, the transport unit moves back to the supply unit for fetching a subsequent bead. In the positioning device of the invention, the transport unit does not need to wait until the bead is arranged on the support body, and fetches a subsequent bead while the previous bead is picked up by the transfer unit and arranged on the support body. Accordingly the cycle time for supplying a bead to the support body is significantly reduced.

Although only the part of the transport unit which may traverse the position of the bead on the holding unit, i.e. the gripper, needs to be arranged behind the holding surface in order to move the transport unit back to the supply unit while a bead is retained against the holding surface, in an embodiment, the transport unit is completely arranged behind the holding surface, as viewed from the first side, when the gripper is in the second position.

In an embodiment, the gripper is adapted for locking in the bead on the first side of the surface when in the first position. In the prior art transport unit, the bead is only supported on top of the two support member and there is a chance that the bead falls down from the transport unit, which seriously disturbs the manufacturing process for forming a tire bead assembly. The locking in as provided by this embodiment of the device of the invention prevents that a bead falls down from the transport unit.

In an embodiment, the gripper is rotatable arranged on said transport unit, wherein the gripper is rotatable around a rotation axis for moving the gripper between the first position and the second position. In an embodiment, the rotation axis is arranged at a distance behind the holding surface, as viewed from the first side, and at least substantially parallel to the holding surface. By arranging the rotation axis at a distance behind the holding surface the rotatable gripper has a tendency to move a bead which is gripped by the gripper towards the holding surface, which further supports the firm and secure holding of the bead.

In an embodiment, the gripper comprises a distal end spaced apart from the rotation axis, wherein the transport unit comprises an abutment surface, and wherein in the first position of the gripper, the distal end is arranged to abut against the abutment surface. When the gripper is in the first position, the combination of the gripper and the abutment surface surround the bead and thereby lock in the bead.

In an embodiment, the abutment surface comprises a recess, wherein the distal end of the gripper is arranged in the first position to reach into the recess and abut against the abutment surface, and wherein the recess is arranged to substantially fix the position of the gripper against lateral movement of the gripper in the first position. Thus, by positioning the distal end of the gripper in the first position in the recess, lateral movement of the gripper in a direction substantially parallel to the abutment surface can substantially be prevented.

In an embodiment, the abutment surface comprises a main portion which is substantially flush with the first side of the holding surface. In an embodiment, the abutment surface transitions into a guide surface which is inclined with respect to the abutment surface.

In an embodiment, the gripper is arranged to approach the holding surface from the first side thereof when moving towards the first position. In an embodiment, the gripper is arranged to move along an at least substantially circular trajectory when moving from the second towards the first position, wherein a first part of the trajectory is arranged to move the gripper away from the holding surface at the first side thereof, and a subsequent second part of the trajectory is arranged to move the gripper towards the holding surface from the first side.

In an embodiment, the transport unit comprises an actuator for driving movement of the gripper. In an embodiment, the actuator comprises a pneumatic cylinder.

In an embodiment, the holding surface is a substantially vertical planar surface. By arranging the holding surface substantially vertical the positioning device of this embodiment requires less floor space.

In an embodiment, the bead retainer is adapted for holding the bead substantially flat against the first surface. In an embodiment, the bead retainer comprises a magnet arranged behind the holding surface, as viewed from the first side, for attracting a bead to the first side of the surface. In an embodiment, the magnet is moveable from a position close to the holding surface, to a position further apart from the holding surface, for varying the strength of the magnetic field for attracting the bead to the first side.

In an embodiment, the holding surface comprises one or more slots, and wherein the gripper is arranged for protruding through the slot when in the first position.

In an embodiment, the device comprising one or more additional grippers mounted on the transport unit.

In an embodiment, the device further comprising bead width measuring device adapted for measuring a width of the bead. In an embodiment, the bead width measuring device comprises an emitter and a receiver, wherein the emitter is arranged for emitting a light beam along the holding surface at the first side thereof towards the light receiver, wherein the emitter and receiver are arranged with respect to the bead retainer such that the light beam is at least partially blocked by a bead which is retained by the bead retainer on the holding surface, and wherein the measuring device is arranged for determining the width of the bead based on the part of the light beam that reaches the light receiver.

In an embodiment, the emitter and receiver are arranged for emitting and receiving the light beam having a width which is larger than the width of the bead. In an embodiment the width of the light beam is larger than twice the width of the bead, which implements the detection of a double bead, i.e. two beads which are not separated or partially separated.

According to a second aspect, the invention provides a method of positioning a bead using a device of the invention as described above, said method comprising the steps of:
moving the transport unit to a pick-up position for picking up a bead,
picking up a bead with the gripper,
moving the transport unit to a holding position on the holding surface,
activating the bead retainer to retain the bead against the first side
moving the gripper to the second position, and
moving the transport unit back to the pick-up position.

In an embodiment, the holding position is dependent on the diameter of the bead such that the bead is arranged with its center at a substantially predetermined position on the holding surface.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

FIGS. 2A, 2B and 2C are schematic side views of an example of the transport unit, showing various positions of the gripper;

FIGS. 4A, 4B and 4C are schematic side views of a second example of the transport unit, showing various positions of the gripper.

DETAILED DESCRIPTION OF THE INVENTION

Figure 1A:
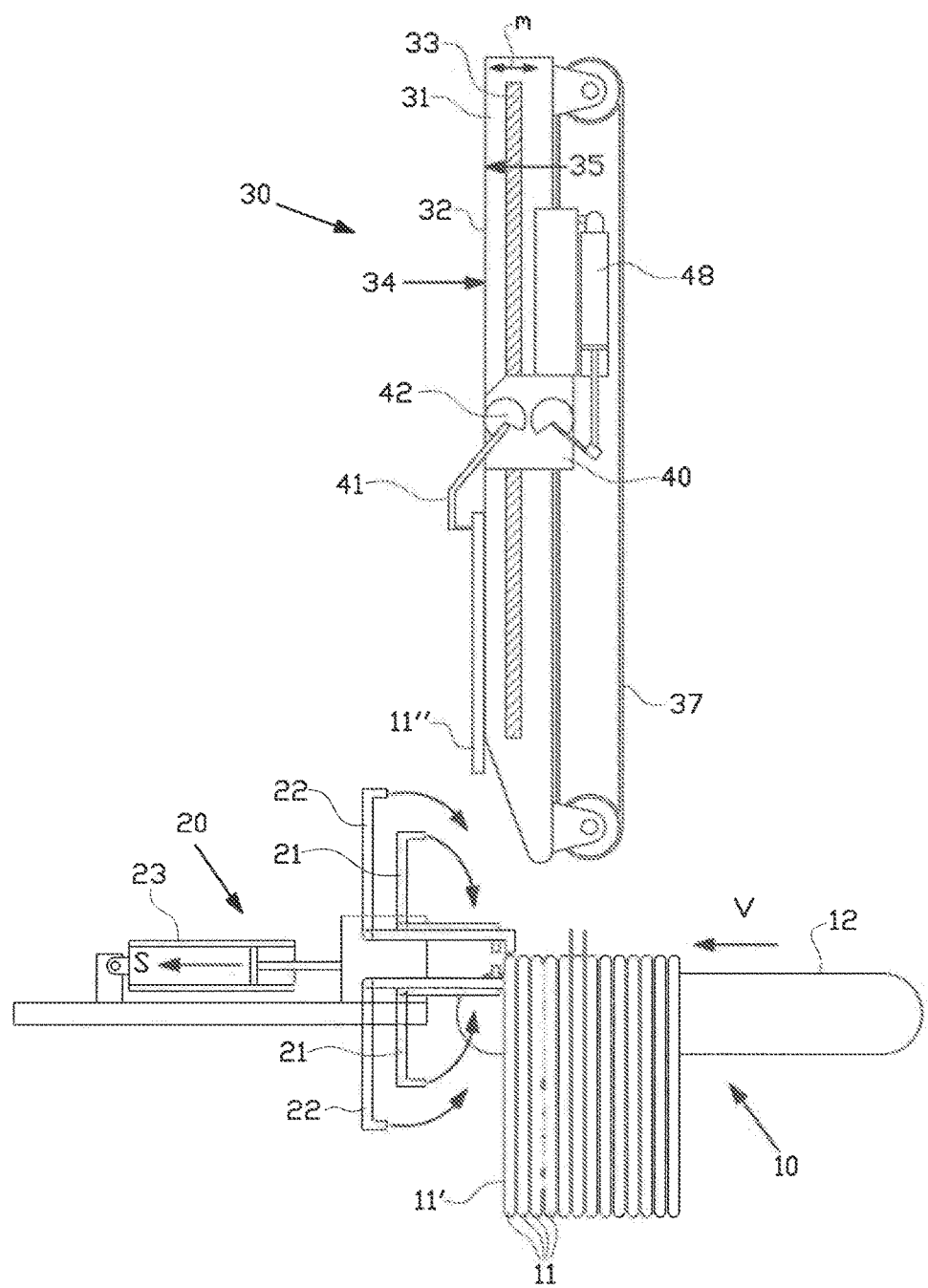
FIG. 1A is a schematic side view of an example of a positioning device of the invention and a bead supply unit.

In the process of tire manufacturing, individual beads are to be supplied to an apparatus for forming a tire bead assembly. As shown in FIG. 1A, a plurality of beads 11 are arranged on a bead supply unit 10. For supplying individual beads 11 to the apparatus for forming the tire bead assembly, a single bead 11 is removed from the bead supply unit 10 using a bead separator 20. The single bead 11' is than gripped by the gripper of the positioning device 30 and moved upwards to a holding position where the bead 11" is retained. A transfer unit (not shown), for example comprising a robotic arm, picks up the bead 11" from the holding unit 30 and arranges the bead 11 on a support body of an apparatus for forming a tire bead assembly.

The bead supply unit 10 of this example is arranged on an arm of a carousel, comprising a conveyor 12. The conveyor 12 moves the plurality of beads 11 towards the bead separator, in the direction v, each time a bead 11 has been removed from the bead supply unit 10.

In order to separate one bead 11' from the plurality of beads 11, two first bead separator grippers 21 grip the front first bead 11' of the bead supply unit 10. Two second bead separator grippers 22 grip the second bead 11 of the bead supply unit 10. Subsequently, the first bead separator grippers 21 pull the first bead 11' away from the plurality of beads 11, by actuating the air cylinder 23 in the direction S away from the bead supply unit 10. Since the plurality of beads 11 may stick together, a separator disk (not shown) is moved in between the first 11' and second 11 bead in order to separate the first bead 11' from the plurality of beads 11.

Figure 1B:
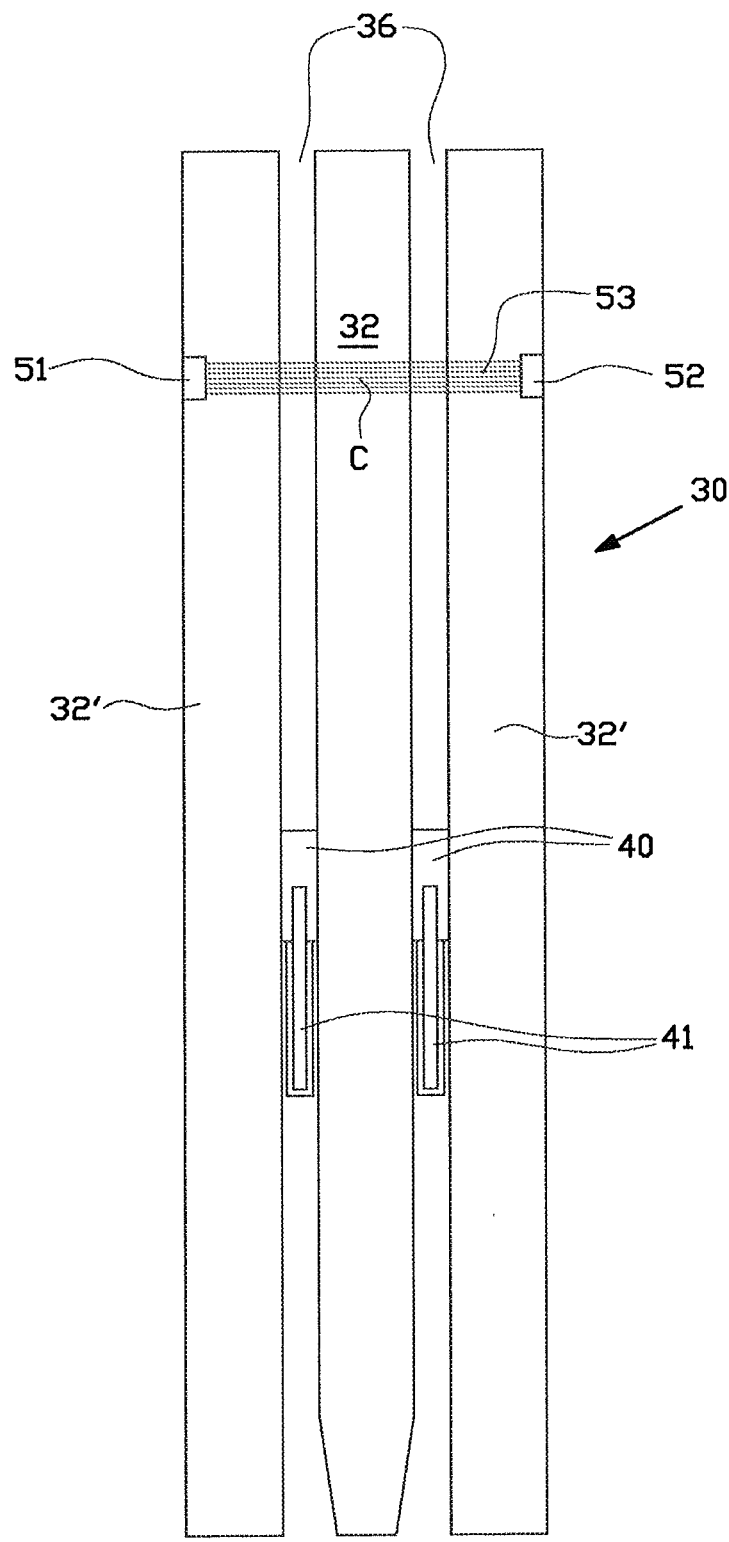
FIG. 1B is a schematic front view of the example of the positioning device of FIG. 1A.

After the first bead 11' has been separated, the transport unit 40 of the positioning device 30 moves down and the grippers 41 take the bead 11" from the first bead separator grippers 21 and moves the bead 11" upwards to the holding position on the holding unit 31. The holding unit 31 comprises a substantially vertical planar holding surface 32 having a first side 34, and a bead retainer arranged for at least temporarily retaining the bead 11" in abutment against the holding surface 32 at the first side 34 thereof. As shown in FIG. 1B, the holding surface 32 comprises two side surfaces 32' which are separated from a centre surface 32 by means of two slots 36, and the grippers 41 of the transport unit 40, arranged for protruding through the slots 36 for gripping a bead 11".

The bead retainer comprises magnets 33 arranged on a second side 35 of the planar holding surface 32, thus behind the holding surface 32 as viewed from the first side 34, for attracting a bead 11" to the first side 34 of the surface 32. The magnet 33 is moveable from a position close to the holding surface 32 to a position further apart from the holding surface 33, in the direction m, for varying the strength of the magnetic field for attracting the bead 11" to the first side 32.

The transport unit 40 is movable parallel to the holding surface 32 and is in this example connected to a belt drive 37 for activating the transport unit 40. The belt drive 37 is arranged behind the holding surface 32, as viewed from the first side 34.

The transport unit 40 of this example comprises two grippers 41 (as shown in FIG. 1B) which are rotationally fixed connected to each other and are together movable between a first position (as shown in FIGS. 1A and 2B) in which the grippers 41 project at least partially out of the holding surface 32 at the first side 34 thereof for gripping the bead 11", and a second position (as shown in FIG. 2C), in which the grippers 41 are completely arranged behind the holding surface 32, as viewed from the first side 34. When the grippers 41 are in the second position (as shown in FIG. 2C), the transport unit 40 is completely arranged behind the holding surface 32, as viewed from the first side 34.

The grippers 41 are rotatable arranged on said transport unit 40, wherein the grippers 41 are rotatable around a rotation axis 42 for moving the grippers 41 between the first position and the second position. The rotation axis 42 is arranged at a distance d behind the holding surface 32, as shown in FIG. 2A, and at least substantially parallel to the holding surface 32. The grippers comprise a distal end 43 facing away from the rotation axis 42. The transport unit 40 comprises an abutment surface 44. In the first position of the grippers 41, their distal end 43 is arranged to abut against the abutment surface 44. The abutment surface 44 comprises a main portion which is substantially flush with the first side 34 of the holding surface 32, and a guide surface 45 which is inclined with respect to the abutment surface 44 for guiding a bead 11" to be gripped onto the abutment surface 44. When a bead 11" to be gripped is arranged onto the abutment surface 44, the grippers 41 move along an at least substantially circular trajectory t when moving from the second towards the first position as shown in the FIGS. 2A, 2B, 2C. A first part I of the trajectory t is arranged to move the grippers 41 away from the holding surface 32 at the first side 34 thereof, and a subsequent second part II of the trajectory t is arranged to move the grippers 41 towards the holding surface 44 from the first side 34. The grippers are arranged to approach the holding surface 32 from the first side 34 thereof when moving towards the first position. When the grippers 41 are in the first position, as shown in FIG. 2B, each combination of a gripper 41 and the abutment surface 44 surround the bead 11" and thereby lock in the bead 11".

In an alternative embodiment, as shown in FIGS. 4A, 4b and 4C, the abutment surface 44 comprises a recess 46 which is arranged at the position where the distal end 43 of the gripper 41 abut against the abutment surface 44. In the first position of the grippers 41, their distal end 43 is arranged to reach into the recess 46 and abut against the abutment surface 44. The recess 46 is arranged to substantially fix the position of the gripper 41 against lateral movement of the gripper 41 when in the first position. Thus, by positioning the distal end 43 of the gripper 41 in the recess, lateral movement of the gripper 41 in the first position can substantially be prevented.

As shown in the example of FIG. 1A, the transport unit 40 comprises a pneumatic actuator 48 for driving the movement of the grippers 41. The actuator 48, in this example is pneumatic cylinder, is coupled to the grippers 41 via a gear transmission. When the pneumatic cylinder is not under pressure, the grippers 41 will hold their current position.

As shown in FIG. 2C, when in the second position, the grippers 41, at least the centre of mass thereof, are substantially arranged at a greater distance behind the holding surface 32 then the rotation axis 42. The grippers 41 are therefore in a stable position and remain in this position at least until they are actuated by the actuator 48.

In addition, when in the second position, the transport unit 40 can move down behind the bead 11" which is retained on the holding surface 32.

In the first position, as shown in FIG. 2B, the bead 11" is held by the grippers 41. Due to the weight of the bead 11" and/or when there is an additional downwards pull on the bead 11", the grippers 41 are pulled downwards and more firmly against the abutment surface 44 which prevents that the bead 11" inadvertently falls down from the grippers 41.

The positioning device 30 is furthermore provided with a bead width measuring device 51, 52 adapted for measuring a width of the bead 11". The bead width measuring device comprises an emitter 51 and a receiver 52, wherein the emitter 51 is arranged for emitting a light beam 53 along the holding surface 32 at the first side 34 thereof towards the light receiver 52. The emitter 51 and receiver 52 are arranged such that the light beam 53 is at least partially blocked by a bead 11" which is retained by the bead retaining magnets 33 on the holding surface 32. The measuring device 51, 52 are arranged for determining the width of the bead 11" based on the part of the light beam that reaches the light receiver 52.

The emitter 51 and receiver 52 are arranged at opposite sides of the holding position, in particular at opposite sides of a center position C where the center of a bead 11" is at least substantially arranged when said bead 11" is retained at the holding position. The measuring device 51, 52 thus measures the width w of the bead 11" substantially along the diameter of the bead 11".

Figure 3:
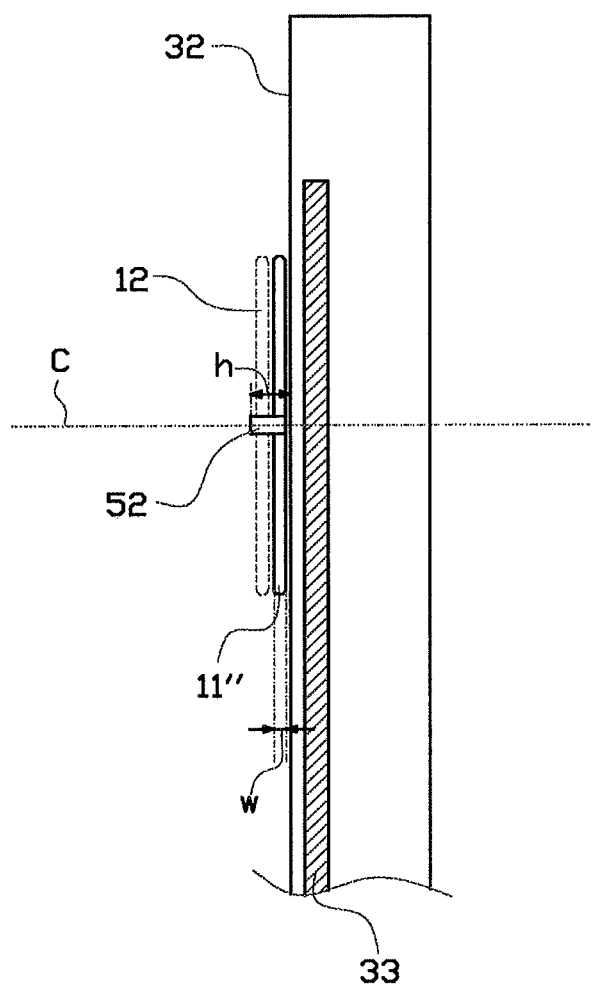
FIG. 3 is a schematic side view of the positioning device of FIG. 1B at the holding position.

The measuring device 51, 52 measures the width of a bead in order to establish whether or not the width of the bead is within a desired range. In view of this the emitter 51 and receiver 52 are arranged for emitting and receiving the light beam 53 having a width h which is larger than the width w of the bead 11", as shown in FIG. 3.

In a further embodiment, the measuring device 51, 52 is also arranged to detect when a double bead, i.e. two beads 11", 12 which are not properly separated and still stick at least partially together, is picked up by the gripper 41. The emitter 51 and receiver 52 are arranged for emitting and receiving the light beam 53 having a width h which is larger than twice the width w of the bead 11", as shown in FIG. 3.

Incorrect or faulty beads 11", 12 are moved to a discard position by the transfer unit (not shown).

As stated above, the width h of the light beam 53 is larger than the width w of the bead 11", preferably larger than twice the width w of the bead 11". In particularly, this width h of the light beam 53 is established at least in the direction perpendicular to the holding surface 32, as shown in FIG. 3. In the direction parallel to the holding surface 32, the light beam 53 may be narrow, i.e. less than the width w of the bead 11". The width h light beam 53 is for example 40 millimeters and is arranged at a small distance, a few millimeters, from the holding surface 32. In this case the first millimeter or the first few millimeters of the bead 11", thus the first part which abuts the holding surface 32, is not in the path of the light beam 53 and is therefore not detected.

In an embodiment, the measuring device 51, 52 is arranged to detect a double bead 11", 12 even when they are partially separated, for example having a gap at the position where double bead crosses the path of the light beam 53, as long as the second bead 12 still is arranged in the path of the light beam 53.

In an alternative embodiment, the light beam 53 comprises an array of small light beams which are arranged at least substantially parallel with respect to each other and which are arranged in a plane substantially perpendicular to the holding surface 32.

When a bead 11' is separated by the bead separator 20, the transport unit 40 moves down to a pick-up position for picking up a bead 11'. The transport unit 40 then picks up the bead 11" with the grippers 41, and moves upwards to a holding position on the holding surface 32. At the holding position, the bead retaining magnets 33 are activated to retain the bead 11" against the first side 34 of the holding surface 32. When the bead 11" is retained, the grippers 41 move to the second position, as shown in FIG. 2C, and the transport unit 40 moves back down to the pick-up position.

The holding position is dependent on the diameter of the bead 11" such that each bead is arranged with its center at a substantially predetermined center position C on the holding surface 32. Thus the centre of each bead 11" at the holding position is at least substantially at the same location. Due to this, the transfer unit (not shown), for example comprising a robotic arm, always has the same movement for transferring a bead from the holding unit 30 to the apparatus for forming a tire bead assembly. Changing from one bead size to an other bead size, only requires the transfer unit to grab a larger or smaller bead. No adjustments in the trajectory or movement of the transfer unit are required.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. A positioning device for use in a tire building system and for positioning a bead, the device comprising:
   a holding unit comprising a substantially planar holding surface having a first side and a second side opposite to the first side,
   a transport unit movable parallel to the holding surface and comprising a gripper for gripping the bead and moving the gripped bead substantially along the first side of the holding surface, wherein the gripper comprises a distal end and the transport unit comprises an abutment surface, and
   a bead retainer arranged for at least temporarily retaining the bead in abutment against the holding surface at the first side thereof,
   wherein the gripper is moveable between a first position in which the gripper projects at least partially out of the holding surface at the first side thereof for gripping the bead and in which the distal end of the gripper is arranged to abut against the abutment surface, and a second position, in which the gripper is completely arranged behind the holding surface, as viewed from the first side, and
   wherein when the gripper is in the first position, the combination of the gripper and the abutment surface surround the bead and thereby lock in the bead.

2. The device according to claim 1, wherein the gripper is rotatable arranged on said transport unit, wherein the gripper is rotatable around a rotation axis for moving the gripper between the first position and the second position.

3. The device according to claim 2, wherein the rotation axis is arranged at a distance behind the holding surface, as viewed from the first side, and at least substantially parallel to the holding surface.

4. The device according to claim 2, wherein the distal end faces away from the rotation axis.

5. The device according to claim 4, wherein the abutment surface comprises a recess, wherein the distal end of the gripper is arranged in the first position to reach into the recess and abut against the abutment surface, and wherein the recess is arranged to substantially fix the position of the gripper against lateral movement of the gripper in the first position.

6. The device according to claim 4, wherein the abutment surface comprises a main portion which is substantially flush with the first side of the holding surface.

7. The device according to claim 6, wherein the abutment surface transitions into an guide surface which is inclined with respect to the abutment surface.

8. The device according to claim 2, wherein the gripper is arranged to approach the holding surface from the first side thereof when moving towards the first position.

9. The device according to claim 8, wherein the gripper is arranged to move along an at least substantially circular trajectory when moving from the second towards the first position, wherein a first part of the trajectory is arranged to move the gripper away from the holding surface at the first side thereof, and a subsequent second part of the trajectory is arranged to move the gripper towards the holding surface from the first side.

10. The device according to claim 1, wherein the transport unit comprises an actuator for driving movement of the gripper.

11. The device according to claim 10, wherein the actuator comprises a pneumatic cylinder.

12. The device according to claim 1, wherein the holding surface is a substantially vertical planar surface.

13. The device according to claim 1, wherein the bead retainer is adapted for holding the bead substantially flat against the first side.

14. The device according to claim 1, wherein the holding surface comprises one or more slots, and wherein the gripper is arranged for protruding through the slot when in the first position.

15. The device according to claim 1, comprising one or more additional grippers mounted on the transport unit.

16. The device according to claim 1, wherein the bead retainer comprises a magnet arranged behind the holding surface, as viewed from the first side, for attracting a bead to the first side of the surface.

17. The device according to claim 16, wherein the magnet is moveable from a position close to the holding surface, to a position further apart from the holding surface, for varying the strength of the magnetic field for attracting the bead to the first side.

18. The device according to claim 1, further comprising a bead width measuring device adapted for measuring a width of the bead.

19. The device according to claim 18, wherein the bead width measuring device comprises an emitter and a light receiver, wherein the emitter is arranged for emitting a light beam along the holding surface at the first side thereof towards the light receiver, wherein the emitter and light receiver are arranged with respect to the bead retainer such that the light beam is at least partially blocked by a bead which is retained by the bead retainer on the holding surface, and wherein the measuring device is arranged for determining the width of the bead based on the part of the light beam that reaches the light receiver.

20. The device according to claim 19, wherein the emitter and light receiver are arranged for emitting and receiving the light beam having a width which is larger than the width of the bead.

21. The device according to claim 19, wherein emitter and light receiver are arranged for emitting and receiving the light beam having a width which is larger than twice the width of the bead.

22. A method of positioning a bead using a device according to claim 1, comprising the steps of moving the transport unit to a pick-up position for picking up a bead, picking up a bead with the gripper, moving the transport unit to a holding position on the holding surface, activating the bead retainer to retain the bead against the first side moving the gripper to the second position, and moving the transport unit back to the pick-up position.

23. Method according to claim 22, wherein the holding position is dependent on the diameter of the bead such that the bead is arranged with its center at a substantially predetermined position on the holding surface.

* * * * *